United States Patent [19]
Kirigaya et al.

[11] Patent Number: 5,488,446
[45] Date of Patent: Jan. 30, 1996

[54] INDICATOR WITHIN FINDER OF SINGLE LENS REFLEX CAMERA

[75] Inventors: Tadayuki Kirigaya; Kaoru Imakyure; Hiroyasu Ozaki; Hiroshi Kurei, all of Tokyo, Japan

[73] Assignee: Asahi Kogaku Kogyo Kabushiki Kaisha, Tokyo, Japan

[21] Appl. No.: 230,148

[22] Filed: Apr. 19, 1994

[30] Foreign Application Priority Data

May 14, 1993 [JP] Japan ..................... 5-112691

[51] Int. Cl.⁶ ................................. G03B 17/00
[52] U.S. Cl. ......................... 354/289.1; 354/219
[58] Field of Search ............... 354/219, 289.1, 354/289.12

[56] References Cited

U.S. PATENT DOCUMENTS 4,949,118  8/1990  Yamamoto et al. .
4,977,425  12/1990  Yamamoto et al. .
5,218,393  6/1993  Nakamura et al. .
5,218,396  6/1993  Morisawa .

FOREIGN PATENT DOCUMENTS 61-249034  11/1986  Japan .
2-74936    3/1990   Japan .
3192340    6/1991   Japan .
3140930    6/1991   Japan .

OTHER PUBLICATIONS

English Language Abstract of JP 61–249034.

*Primary Examiner*—Monroe H. Hayes
*Attorney, Agent, or Firm*—Sandler, Greenblum & Bernstein

[57] ABSTRACT

An indicating apparatus within a finder of a single lens reflex camera includes a mirror which reflects light of an object transmitted through a photographing lens to form an object image on a focusing plate, and a finder optical system through which an image of the object formed on the focusing plate is viewed. The indicating apparatus further includes a mirror box which supports the mirror, and a photographing information projector provided on the lower portion of the mirror box to project and indicate an image of the photographing information onto the focusing plate without interfering with the front end of the mirror.

13 Claims, 6 Drawing Sheets

INDICATOR WITHIN FINDER OF SINGLE LENS REFLEX CAMERA

BACKGROUND OF THE INVENTION

1. Field of the Invention

The present invention relates to a superimposing indicator in which photographing information is superimposed and indicated on an object image within a finder in a single lens reflex camera.

2. Description of Related Art

In known superimposing indicators, a mirror that partially functions as a half mirror is provided to project photographing information onto a focusing plate through a lower portion of the half mirror, or a mirror is provided to reflect the photographing information to project the same onto the focusing plate. However, in the former arrangement in which the mirror is partly provided with a half mirror, not only is the half mirror expensive, but also there is an irregular distribution of the quantity of light to be received in the finder. In the latter arrangement in which the reflection of light by the mirror towards the focusing plate occurs, as disclosed, for example in U.S. Pat. No. 4,949,118, it is necessary to relatively incline an image projecting lens and an information chart at a predetermined inclination angle, based on the Scheimpflug's Law. However, it is difficult to easily and correctly adjust the inclination angle. Furthermore, since light is made incident upon the focusing plate in an inclined manner, it is necessary to provide, for example, a small prism or the like on the focusing plate to thereby obtain a clear image of the photographing information.

It is an object of the present invention to provide a simple indicator within a finder, which can be applied to an existing single lens reflex camera without a substantial modification thereof.

Another object of the present invention is to provide a simple indicator for a single lens reflex camera having a picture image area (i.e., picture plane) size switching mechanism which switches a picture image area size between a standard size (i.e., 35 mm size) and an elongated size (i.e., panoramic size), wherein the selection of a panoramic mode can be easily indicated.

SUMMARY OF THE INVENTION

It has been considered to be impossible to realize an indicator within a finder without interfering with a mirror in a single lens reflex camera. Contrary to this practical sense, the inventors of the present invention have found that it is possible to provide an indictor in a space in front of the mirror without interference from the existing mirror. Namely, according to the present invention, there is provided an indicating apparatus within a finder of a single lens reflex camera, including a mirror which reflects a light of an object transmitted through a photographing lens to form an object image on a focusing plate, a finder optical system through which an image of the object formed on the focusing plate is viewed, a mirror box which supports the mirror, and a photographing information projector provided on the lower portion of the mirror box to project a bundle of rays onto the focusing plate to form an image of the photographing information on the focusing plate in a manner such that the mirror does not interfere with the projected bundle of rays.

Preferably, the photographing information projector includes a light emitter, an information chart which is illuminated with light emitted from the light emitter, and a projecting lens which projects the bundle of rays. The information chart can be made of, for example, a light emitting member, such as an LED.

Preferably, the projecting lens has an optical axis which is deviated with respect to the light emitter and the information chart in a parallel manner to prevent the vignetting of light by the mirror. Accordingly, an image can be projected onto a inner portion of the focusing plate. Namely, the optical axis of the projecting lens is deviated in parallel from the light emitter and the information chart while maintaining the orthogonal position relationship between the optical axis of the projecting lens and the focusing plate. It is theoretically possible to incline the projecting lens instead of moving the projecting lens in a parallel manner with respect to a plane perpendicular to the optical axis of the projecting lens, but inclination of the optical axis of the projecting lens is not advisable for the purpose of the prevention of vignetting of light by the mirror. The parallel shift of the projecting lens causes a curvature of field in the image of the information chart. To eliminate or reduce the curvature of the field, the information chart is preferably inclined with respect to a plane perpendicular to the optical axis of the projecting lens.

The mirror box can be provided on the lower portion thereof with a recess to which the photographing information projector is secured as a unit.

In an embodiment, the recess is provided at a corner portion of the mirror box on the object side of the camera and with orthogonal side surfaces.

In a single lens reflex camera in which light transmitted through a photographing lens is reflected by a mirror which is located in a viewing position within a mirror box to form an object image that can be viewed through a finder optical system, and in which a picture image area size is variable between a 35 mm size and a panoramic size which is more elongated than the 35 mm size, according to another aspect of the present invention, an indicating apparatus within a finder of the camera includes panoramic size frames which define the panoramic size picture image area within the finder. The indicating apparatus further includes a panoramic information projector provided at the lower portion of the mirror box to project and indicate an image of the panoramic information on the focusing plate outside the panoramic size frames without interference from the mirror when located in the viewing position.

The panoramic information can include a letter "P" or the word "PANORAMA", by way of example.

In a single lens reflex camera having a picture image area size switching mechanism, it was difficult to clearly indicate the selection of picture image area size, particularly the selection of the elongated panoramic size. In theory, it is possible to provide light intercepting plates in the finder to partly intercept light which would otherwise be made incident upon the upper and lower edges of the field of view of the finder to definitely indicate the selection of the panoramic size. However, it is practically difficult to provide an internal space large enough to accommodate such light intercepting plates for the finder and a moving mechanism therefor in an existing single lens reflex camera. According to the present invention, since the panoramic information is superimposed on an object image at a desired portion of the focusing plate outside the panoramic size frames, the selection of the panoramic size can be certainly recognized by an operator.

The present disclosure relates to subject matter contained in Japanese Patent Application No. HEI 5-112691 (filed on May 14, 1993) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
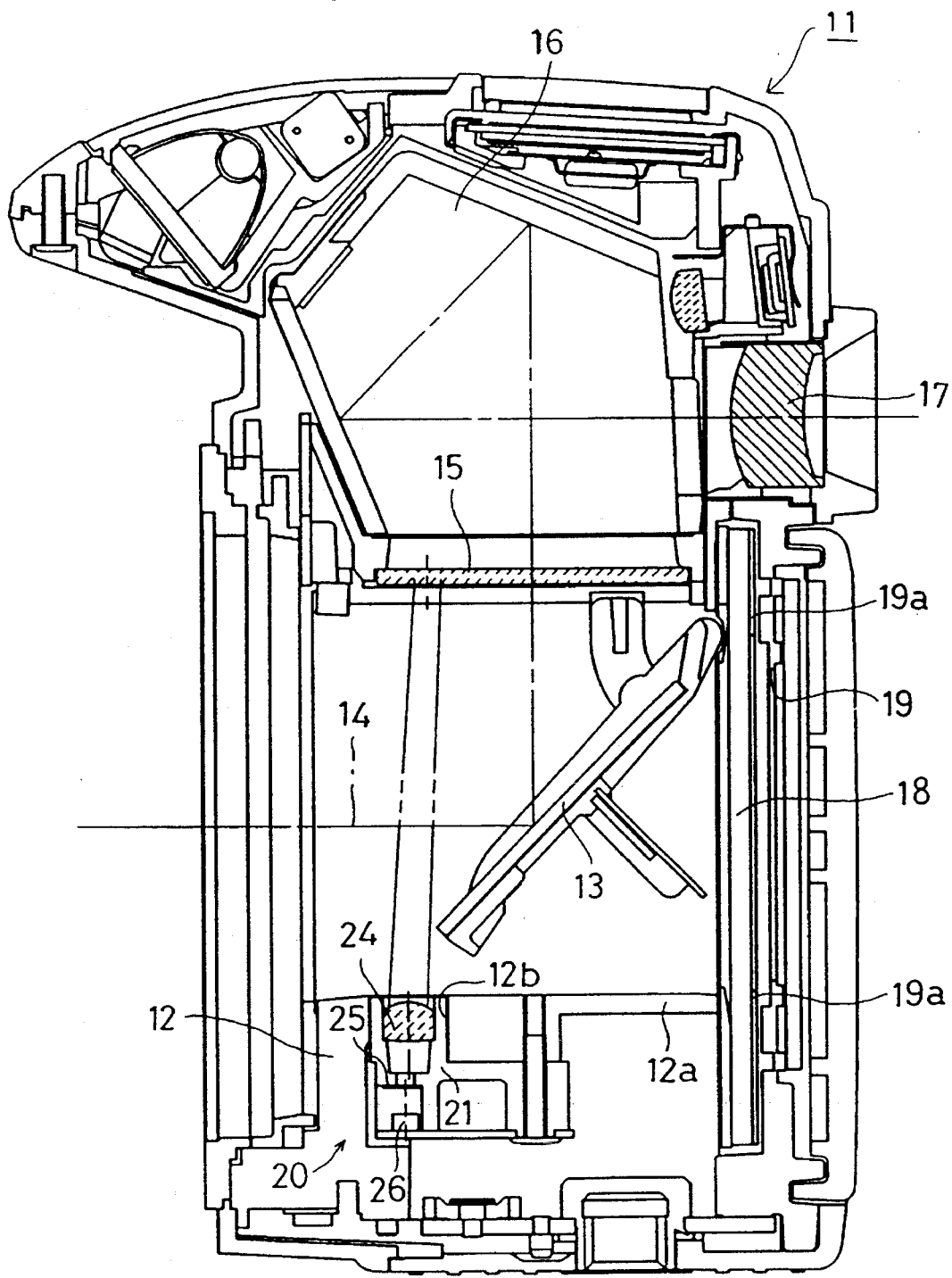
FIG. 1 is a longitudinal sectional view of a camera body of a single lens reflex camera having an superimposing indicator provided within a finder, according to the present invention.

A single lens reflex camera which is generically indicated at 11 in FIG. 1 has a mirror box 12 which is provided therein with a quick return mirror 13. The quick return mirror 13 is normally held in a viewing position in which the quick return mirror 13 is inclined at 45° with respect to the optical axis 14 of a photographing lens to make a bundle of rays of an object to be photographed incident upon a focusing plate 15. Upon photographing a picture of the object, the quick return mirror 13 is rotated to a horizontal position in which the quick return mirror 13 lies in a plane parallel with and close to the focusing plate 15, so that the quick return mirror 13 is retracted from the optical axis of the photographing lens. Consequently, the bundle of rays of the object reaches a film surface through a focal-plane shutter 18. When the quick return mirror 13 is located in the viewing position, an object image formed on the focusing plate 15 is inverted by a pentagonal prism 16 in the vertical and horizontal directions to obtain an erect real image through an eyepiece 17. The pentagonal prism 16 can be replaced with a pentagonal mirror.

The single lens reflex camera 11 includes an aperture 19 behind a focal-plane shutter 18 to define a 35 mm photographing size. There are a pair of movable light intercepting plates 19a which are provided between the focal plane shutter 18 and the aperture 19 to move in the vertical directions of the aperture 19. The panoramic size of aperture is obtained when the light intercepting plates 19a move close to each other to partly close the upper and lower edges of the aperture 19. The light intercepting plates 19a are usually located in the retracted position in which the light intercepting plates 19a are retracted outside the aperture 19 to define the standard size (i.e., 35 mm) aperture. Since the subject of the present invention is not directly addressed to the moving mechanism of the light intercepting plates 19, no detailed explanation therefor is given herein.

A photographing information indicating unit 20 according to the present invention is provided on the lower wall surface 12a of the mirror box 12. The lower wall surface 12a is provided on the front left end thereof (as viewed from the front) with a rectangular recess (i.e., angular recess) 12b in plan view. The photographing information indicating unit 20 is secured to the recess 12b.

Figure 2:
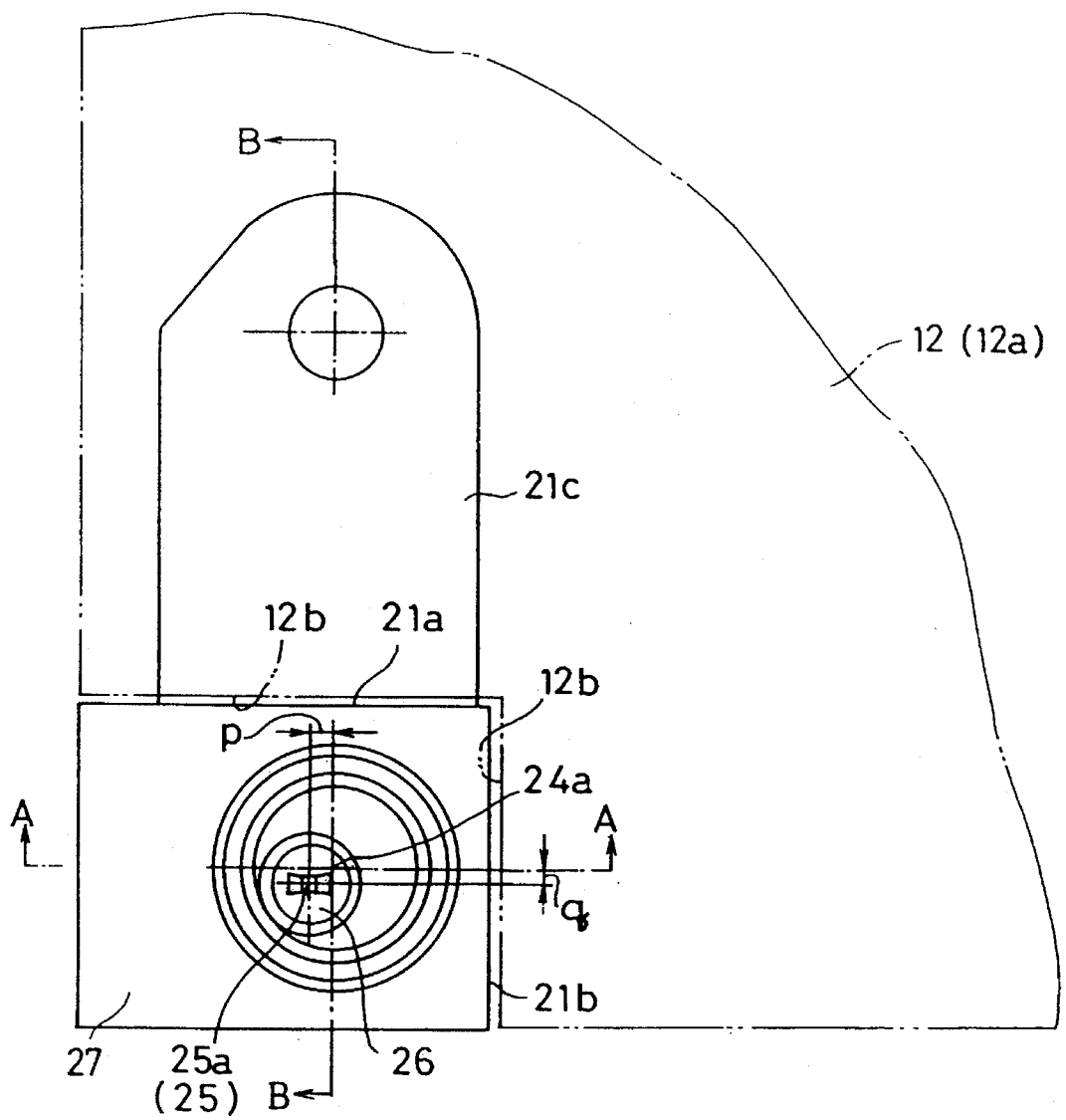
FIG. 2 is a plan view of a photographing information projecting unit according to the present invention.
Figure 3:
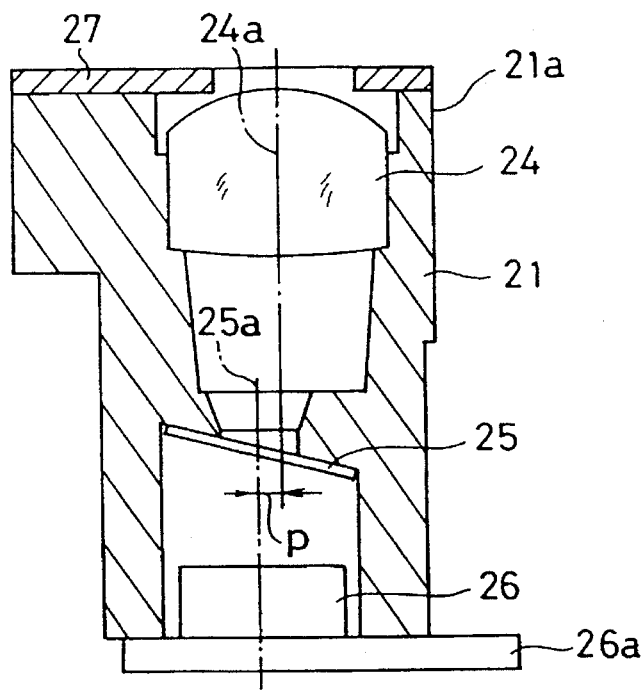
FIG. 3 is a sectional view along the line A—A in FIG. 2.
Figure 4:
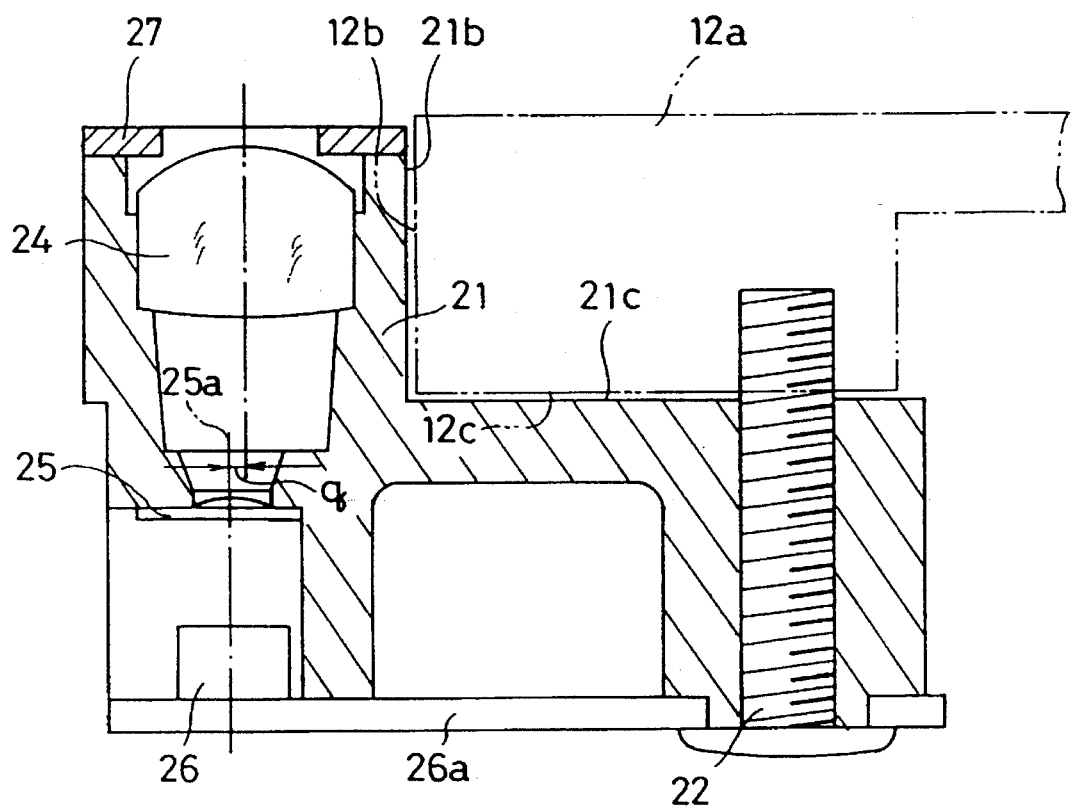
FIG. 4 is a sectional view along the line B—B in FIG. 2.

FIGS. 2 through 4 show the internal structure of the photographing information indicating unit 20. The photographing information indicating unit 20 has a body 21 made of synthetic resin, which is provided with reference surfaces 21a and 21b corresponding to two adjacent orthogonal side surfaces of the rectangular recess 12b. The indicator body 21 is also provided with an abutting surface 21c which abuts against the lower surface 12c of the mirror box 12. The indicator unit 20 is immovably held in the horizontal and vertical directions through the contact of the reference surfaces 21a and 21b of the indicator body 21 with the corresponding adjacent surfaces of the angular recess 12b of the mirror box 12 and the contact of the abutting surface 12c with the corresponding abutting surface 21c, respectively. The indicator unit 20 is secured to the mirror box 12 by a bolt or screw 22.

Figure 5:
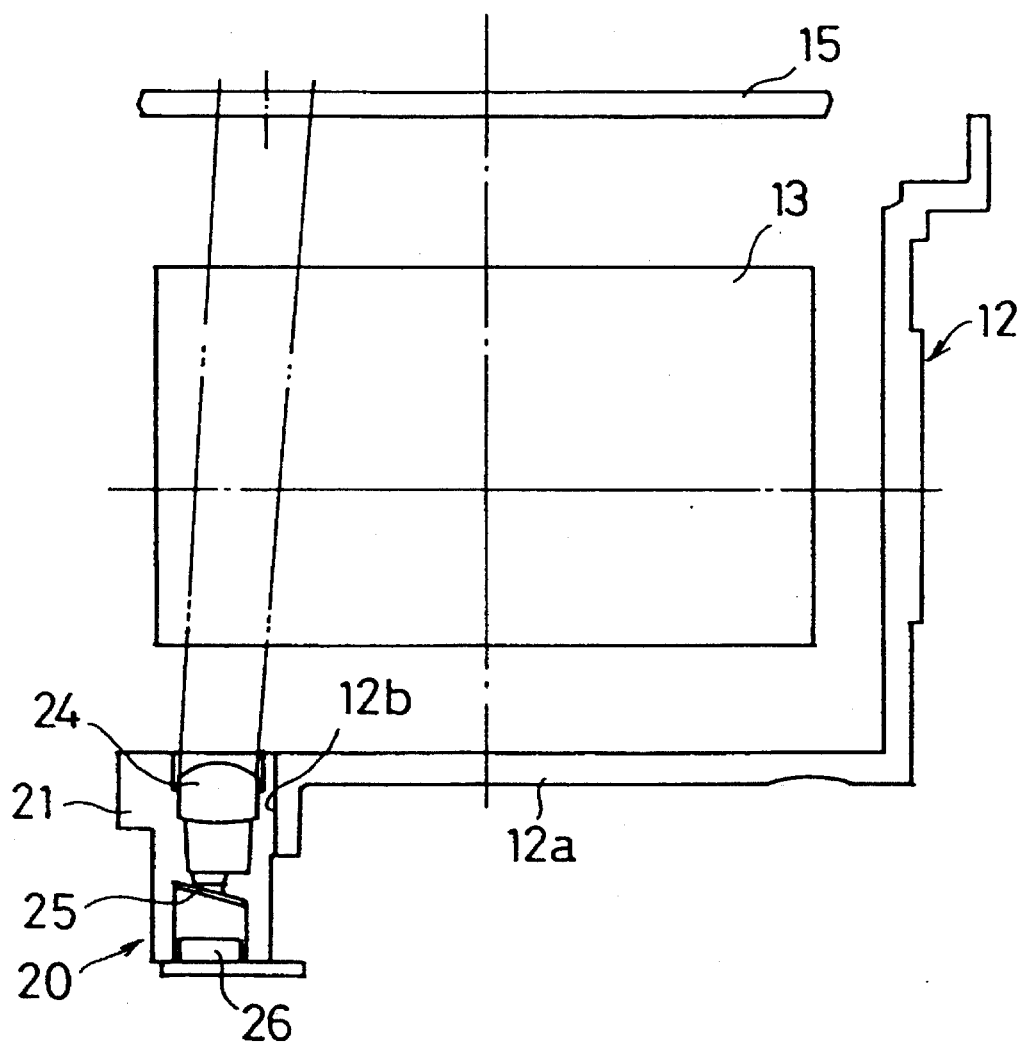
FIG. 5 is a front elevational view of a mirror, a focusing plate, and a photographing information projecting unit according to the present invention.
Figure 6:
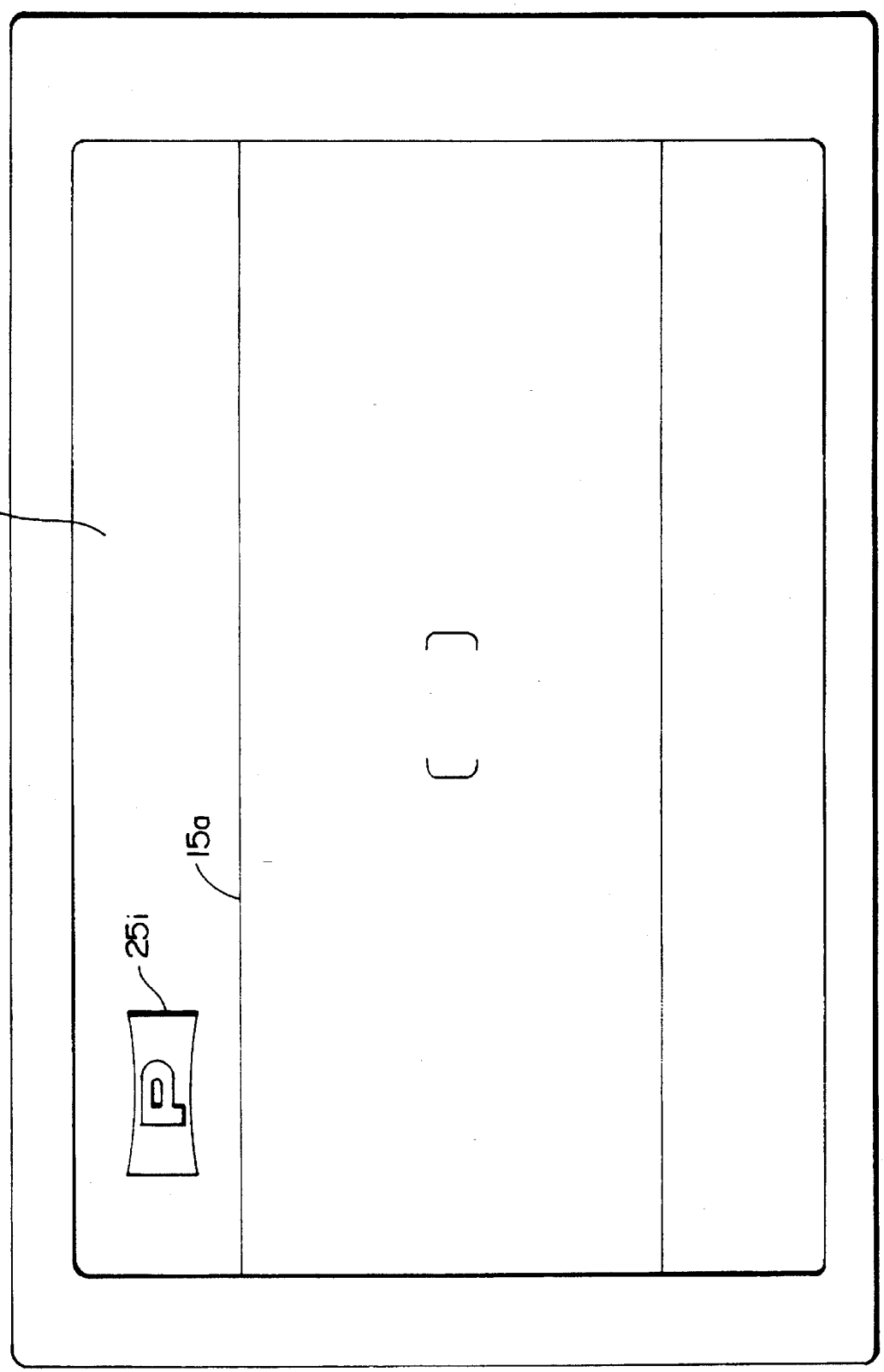
FIG. 6 is a plan view of a focusing plate.
Figure 7:
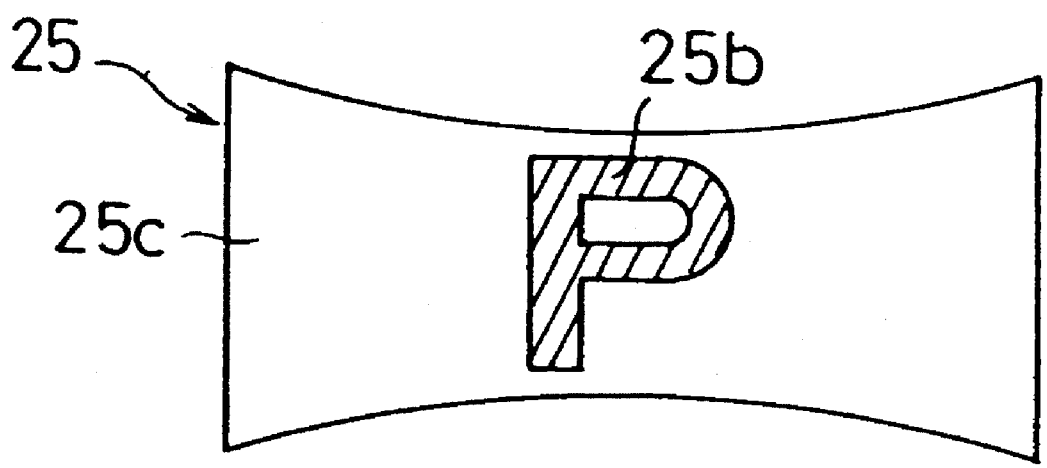
FIG. 7 is a plan view of an information chart, by way of example.

The indicator body 21 has a projecting lens 24, an information chart 25, and an LED 26, secured thereto. These elements 24, 25 and 26 are located in this order from above, as viewed in FIG. 4. The projecting lens 24 is made of a single small lens. The information chart 25 is made of a transparent body 25c which is provided on the central portion thereof with a mark 25b which is, for example, in the form of a letter "P", as shown in FIG. 7. The mark 25b is made of a low transmittance material. The LED 26 is made of a red light emitting diode secured to a substrate 26a. The optical axis 24a of the projecting lens 24 is deviated in the vertical and horizontal directions from the center axis 25a of the information chart 25 and the LED 26 in parallel therewith (FIG. 2). The deviation (i.e., shift) is such that the optical axis 24a is located closer to the corner of the angular recess 12b, defined by the adjacent side surfaces, than the center axis 25a of the information chart 25 (and the LED 26). The value p of deviation in the horizontal direction is larger than the value q in the vertical direction of FIG. 2. The image 25i of the information chart 25 approaches the center of the focusing plate 15 as the deviation of the projecting lens 24 increases (FIG. 6). FIG. 1 shows an inclination of projecting light caused by the deviation of the optical axis 24a in the vertical direction of FIG. 2. FIG. 5 shows an inclination of projecting light caused by the deviation of the optical axis 24a in the horizontal direction of FIG. 2, by way of example.

Thus, due to off-axis light of the projecting lens 24, the image 25i of the information chart 25 can be projected onto the inner portion of the focusing plate 15 without interference from the quick return mirror 13 in the viewing position.

FIG. 6 shows an example of the image 25i of the information chart 25 formed on the focusing plate 15. The image 25i is located outside panoramic frame lines 15a, which are drawn on the focusing plate 15 to define a field of view for panoramic photographing, and as close as possible to the center of the field of view. The parallel shift of the optical axis 24a of the projecting lens 24 from the center axis 25a is more advantageous than inclining the projecting lens 24, to ensure that image 25i of the information chart 25 is formed at an inner portion of the focusing plate 15 without interference from the quick return mirror 13.

On the other hand, the shift of the optical axis 24a of the projecting lens 24 causes the projection image 25a of the information chart 25 on the focusing plate 15 to have a curvature of the field. Accordingly, the information chart 25 is inclined in a direction to reduce the curvature of the field of the projection image 25a, as may be seen in FIG. 3. Namely, the information chart 25 is inclined with respect to a plane perpendicular to the optical axis 24a. Moreover, the upper and lower edges of the information chart 25 are concave so that the projection image 25a on the focusing plate 15 has a rectangular shape, as shown in FIG. 7, in which the concave shape is exaggerated.

A light intercepting member 27 is provided on the indicator body 21 and above the projecting lens 24 to surround the periphery of the latter to thereby prevent an internal reflection thereby.

In the single lens reflex camera 11 as constructed above, the light intercepting plates 19a are retracted from the aperture 19 at the standard size mode. In this state, even if a photometering switch (not shown) is actuated when a release button is depressed by half step, no light is emitted from the LED 26 of the photographing information indicating unit 20. Namely, no image 25a of the information chart 25 is formed on the focusing plate 15.

On the other hand, when the panoramic size mode is selected, the light intercepting plates 19a are moved close to each other to partly cover the upper and lower edges of the aperture 19 to define the panoramic size of picture plane. In this state, if the photometering switch is actuated when the release button is depressed by half step, light is emitted from the LED 26 of the photographing information indicating unit 20, so that the image 25a of the information chart 25 is projected onto the focusing plate 15. Thus, a photographer can recognize the selection of the panoramic mode through the indication of the image 25a within the finder (FIG. 6). In the illustrated embodiment, the circumferential portion 25c of the information chart 25 that has a higher transmittance than the mark 25b is indicated by red color through the red LED 26, and the letter "P" having a low transmittance, provided at the center portion of the information chart 25 is indicated in black. Namely, a photographer can clearly view the black image of the letter "P" appearing on the red background. Thereafter, if the shutter button is depressed by full step, the LED 26 is turned OFF, and then, the shutter 18 is fully opened to carry out the exposure. That is, the LED 26 is turned OFF prior to the exposure so as not to have an adverse influence on the exposure.

Although the above-mentioned embodiment is applied to an indication of the selection of the panoramic mode, the present invention can be applied to the indication of any photographing information. For instance, it is possible for the information chart 25 of an LCD to be used for indicating shutter speed, or diaphragm value, etc. Furthermore, the present invention can also be applied to indicate an elongated size of picture image area other than the panoramic size, such as that for a high definition picture in which the ratio between the horizontal length of the picture image area and the vertical length thereof is smaller than the panoramic size.

As can be seen from the above discussion, according to the present invention, since the photographing information indicating unit is provided on the lower portion of the mirror box without interference from the front end of the mirror, which is located in the viewing position to project and indicate an image of the photographing information onto the focusing plate, the image of the photographing information can be superimposed on an object image. This can be easily realized without substantial alteration of an existing single lens reflex camera.

The present invention can be advantageously applied, in particular, to a single lens reflex camera having a variable picture image area size to clearly indicate the selection of the panoramic size.

We claim:

1. An indicating apparatus within a finder of a single lens reflex camera, comprising:

a mirror which reflects light of an object transmitted through a photographing lens to form an object image on a focusing plate;

a finder optical system through which an image of the object formed on a focusing plate is viewed;

a mirror box which supports a mirror; and, a photographing information projector provided on the lower portion of the mirror box to project a bundle of rays onto the focusing plate to form an image of the photographing information in a manner such that the bundle of rays is projected without interference from the mirror.

2. The indicating apparatus of claim 1, wherein said photographing information projector comprises a light emitter, an information chart which is illuminated with light emitted from the light emitter, and a projecting lens which projects said bundle of rays.

3. The indicating apparatus of claim 2, wherein said projecting lens has an optical axis which is deviated with respect to the light emitter and the information chart in a parallel manner to project the image of the photographing information onto an inner portion of the focusing plate.

4. The indicating apparatus of claim 3, wherein said information chart is inclined with respect to a plane perpendicular to the optical axis of the projecting lens to reduce a curvature of the field caused by the parallel deviation of the optical axis of the projecting lens.

5. The indicating apparatus of claim 3, wherein said mirror box is provided on the lower portion thereof with a recess to which the photographing information projector is secured as a unit.

6. The indicating apparatus of claim 5, wherein said recess is provided at a corner portion of the mirror box on an object side of the camera, and wherein the recess has orthogonal side surfaces.

7. The indicating apparatus of claim 6, wherein said photographing information projector has a body which is provided with orthogonal reference surfaces which abut against the corresponding orthogonal side surfaces of the recess of a mirror box to define the position of the photographing information projector in the two orthogonal directions.

8. The indicating apparatus of claim 7, wherein said information chart includes a symbol.

9. The indicating apparatus of claim 8, wherein the symbol is one of a letter "P" and a word "PANORAMA".

10. An indicating apparatus within a finder of a single lens reflex camera, comprising:

a photographing information projector including a light emitter, an information chart which is illuminated with light emitted from the light emitter, and a projecting lens which forms an image of the information chart on a focusing plate of the single lens reflex camera;

said projecting lens being provided with an optical axis deviated from the light emitter and the information chart in a parallel manner; and, said information chart being inclined with respect to a plane perpendicular to an optical axis of the projecting lens to reduce a curvature of a field caused by parallel deviation of the optical axis of the projecting lens.

11. The indicating apparatus of claim 10, wherein upper and lower edges of said information chart are concave.

12. An indicating apparatus within a finder of a single lens reflex camera in which light transmitted through a photographing lens is reflected by a mirror which is located in a viewing position within a mirror box to form an object image that can be viewed through a finder optical system, and in which a picture image area size is variable between a 35 mm size and a panoramic size which is more elongated than the 35 mm size, wherein the indicating apparatus includes panoramic size frames which define a panoramic size picture image area within the finder, and a panoramic information projector provided at a lower portion of the mirror box to project and indicate an image of a panoramic information on the focusing plate outside the panoramic size frames without interference from the mirror when located in a viewing position.

13. The indicating apparatus of claim 12, wherein said panoramic information projector indicates one of a letter "P" and a word "PANORAMA" on the focusing plate.

\* \* \* \* \*

UNITED STATES PATENT AND TRADEMARK OFFICE
CERTIFICATE OF CORRECTION

PATENT NO. : 5,488,446
DATED : January 30, 1996
INVENTOR(S) : T. KIRIGAYA et al.

It is certified that error appears in the above-indentified patent and that said Letters Patent is hereby corrected as shown below:

At column 6, line 4 (claim 1, line 9), change "the" to ---a---.

At column 6, line 6 (claim 1, line 11), change "the" (first occurrence) to ---a---.

At column 7, line 5 (claim 12, line 12), delete "a".

At column 7, line 6 (claim 12, line 13), change "the" (first occurrence) to ---a---.

Signed and Sealed this

Thirty-first Day of December, 1996

Attest:

BRUCE LEHMAN

*Attesting Officer*        *Commissioner of Patents and Trademarks*